US012450197B2

(12) United States Patent
Khurana et al.

(10) Patent No.: US 12,450,197 B2
(45) Date of Patent: Oct. 21, 2025

(54) BACKGROUND DATASET MAINTENANCE

(71) Applicant: Databricks, Inc., San Francisco, CA (US)

(72) Inventors: Amandeep Khurana, San Francisco, CA (US); Nong Li, San Francisco, CA (US)

(73) Assignee: Databricks, inc., San Francisco, CA (US)

( * ) Notice: Subject to any disclaimer, the term of this patent is extended or adjusted under 35 U.S.C. 154(b) by 75 days.

(21) Appl. No.: 16/935,654

(22) Filed: Jul. 22, 2020

(65) Prior Publication Data

US 2021/0081358 A1   Mar. 18, 2021

Related U.S. Application Data

(60) Provisional application No. 62/902,296, filed on Sep. 18, 2019.

(51) Int. Cl.
*G06F 15/16* (2006.01)
*G06F 9/54* (2006.01)
(Continued)

(52) U.S. Cl.
CPC ............ *G06F 16/162* (2019.01); *G06F 9/546* (2013.01); *G06F 16/164* (2019.01);
(Continued)

(58) Field of Classification Search
None
See application file for complete search history.

(56) References Cited

U.S. PATENT DOCUMENTS

| | | | |
|---|---|---|---|
| 8,924,981 B1 * | 12/2014 | Brown | G06F 16/24532 709/225 |
| 2007/0157200 A1 * | 7/2007 | Hopkins | G06F 9/3004 718/100 |

(Continued)

OTHER PUBLICATIONS

Colesky et al. A Critical Analysis of Privacy Design Strategies. 2016 IEEE Security and Privacy Workshops, pp. 33-40. (Year: 2016).*

(Continued)

*Primary Examiner* — Tony Mahmoudi
*Assistant Examiner* — Shelly X Qian
(74) *Attorney, Agent, or Firm* — Fenwick & West LLP

(57) ABSTRACT

Various embodiments of the present technology generally relate to management of big data storage and the physical removal of data via data access systems for large data processing environments having multiple application services and multiple storage services. In some embodiments, a method of physically removing data from a storage system provides for identifying one or more files needing data removal treatment, determining that a file needing data removal treatment should be queued, and populating a queue with the file. Determining that a file should be queued is based, at least in part, on a staleness tolerance. The method further provides for treating the file and replacing a previous version of the file in storage with the updated file. In some implementations, treating the file includes removing data from the file to create an updated file and may further include additional changes to the file.

20 Claims, 8 Drawing Sheets

(51) Int. Cl.
    *G06F 16/16*     (2019.01)
    *G06F 16/17*     (2019.01)
    *G06F 16/23*     (2019.01)
    *G06F 21/62*     (2013.01)

(52) U.S. Cl.
    CPC .......... *G06F 16/1734* (2019.01); *G06F 16/23* (2019.01); *G06F 21/6254* (2013.01)

(56) References Cited

U.S. PATENT DOCUMENTS

| | | | | |
|---|---|---|---|---|
| 2014/0053244 | A1* | 2/2014 | Raman | G06F 21/6263 |
| | | | | 709/217 |
| 2015/0128287 | A1* | 5/2015 | LaFever | G06F 21/6254 |
| | | | | 726/27 |
| 2018/0077035 | A1* | 3/2018 | Vlachogiannis | H04L 49/90 |
| 2019/0377901 | A1* | 12/2019 | Balzer | G06F 21/6254 |

OTHER PUBLICATIONS

Al-Zaben et al. General Data Protection Regulation Complied Blockchain Architecture for Personally Identifiable Information Management. iCCESE 2018, pp. 77-82. (Year: 2018).*

Sedayao, et al. Making Big Data, Privacy, and Anonymization work together in the Enterprise: Experiences and Issues. 2014 IEEE International Congress on Big Data. pp. 601-607. (Year: 2014).*

Gupta et al. A Simulation of Priority Based Earliest Deadline First Scheduling for Cloud Computing System. 2014 International Conference on Networks & Soft Computing. pp. 35-39. (Year: 2014).*

\* cited by examiner

Queue Implementation - High Level Algorithm

```
1   queue[file, treatment transformation]
2
3   for each worker:
4       while(true):
5           file,transformation = queue.dequeue()  // block if queue is empty
6           zk_put("/active/" + file, worker.id(), keep_alive=True)
7           new_file = do_tranformation(file, transformation)
8           replace_file(new_file, file)
9           zk_delete("/active/" + file)
10
11  On one planner:
12      while(true):
13          foreach table in tables_needing_maintenance():
14              foreach file in table:
15                  if(need_to_queue(file, table.staleness_requirement)):
16                      queue.enqueue(file, table.maintenance_transformation())
```

FIGURE 7

BACKGROUND DATASET MAINTENANCE

CROSS-REFERENCE TO RELATED APPLICATIONS

This application is related to and claims priority to U.S. Provisional Patent Application No. 62/902,296, entitled "BACKGROUND DATASET MAINTENANCE," filed on Sep. 18, 2019, which is incorporated by reference herein in its entirety.

TECHNICAL FIELD

Various embodiments of the present technology generally relate to management of big data storage and computing technology. More specifically, some embodiments relate to the physical removal of data and background dataset maintenance for data access services.

BACKGROUND

An increasing number of data-intensive applications are being developed to serve various needs, such as processing very large data sets. Multiple storage services employed on clusters of computers are used to distribute various data. In addition to the multiple storage services, various large-scale processing applications have been developed to interact with the large-scale data sets and perform data management tasks, such as organizing and accessing the data and performing related operations with respect to the data.

To deploy the large-scale processing of data from multiple storage services in a computing environment, users are often required to individually configure programs to operate on a specific application service. These individually configured programs operating on each of the application services are typically not operable on a different application service or must be manually rebuilt by an administrator to adapt to the new application service environment. This rebuilding of each of the application services can be time consuming and cumbersome as each application service may have different deployment parameters. Each application service and storage service may require a determination of different data access and deployment requirements, such as determining authorization, performance, and caching parameters. Therefore, current techniques for enabling a user to operate the diverse application services available when accessing large-scale data sets from a variety of storage services are neither efficient nor effective Furthermore, Both the European Union's General Data Protection Regulation (GDPR) and the California Consumer Privacy Act (CCPA) impose strict guidelines for collecting, maintaining, and using consumer data that a data access platform should provide the necessary controls to adhere to. It is of great importance to adhere to the GDPR, CCPA, and other regulations through the entire lifecycle of data. A regulation-compliant platform should be able to effectively respond to a "right to be forgotten" request and have an overall GDPR-compliant data architecture. User data for customers that wish to be forgotten must be physically deleted at the storage level.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments herein relate to systems, methods, and computer-readable storage media for operating a data access system for large data processing environments comprising multiple application services and multiple storage services. In one implementation, a method provides for identifying one or more files needing data removal treatment, determining that a file of the one or more files needing data removal treatment should be queued, and populating a queue with the file. Determining that a file should be queued is based, at least in part, on a staleness tolerance. The method further provides for treating the file and replacing a previous version of the file in storage with the updated file. In the present implementation, treating the file includes removing data from the file to create an updated file, but may include additional changes to the file.

In some examples, a user requests to be forgotten from a system and, in response, is added to a blacklist table. In addition to being added to the blacklist table, the user is logically deleted from the system. Once the user is logically deleted from the system, they are omitted from all subsequent queries within the system. Furthermore, the method may include prioritizing treatments of the one or more files needing data removal treatment based, at least in part, on the staleness tolerance. In addition to prioritizing treatments, the method may include determining that a file should not be queued. In some examples, the file may be queued at a later time based on the staleness tolerance.

In another implementation, a computing apparatus comprises one or more computer-readable storage media, a processing system operatively coupled with the one or more computer-readable storage media, and program instructions stored on the one or more computer-readable storage media to facilitate physical treatment of files in data processing environments comprising multiple application services and multiple storage services. The program instructions, when read and executed by the processing system, direct the processing system to identify one or more files marked as needing data removal treatment, determine that a file of the one or more files marked as needing data removal treatment should be queue, add the file to a queue, treat the file, wherein treating the file includes altering data comprised in the file and creating an updated file, and replace a previous version of the file in storage with the updated file.

In yet another implementation, one or more computer-readable storage media includes program instructions stored thereon to facilitate physical treatment of files in storage for data processing environments comprising multiple application services and multiple storage services. The program instructions, when read and executed by a processing system, direct the processing system to identify one or more files needing data removal treatment, determine, based at least on a staleness tolerance, that a file of the one or more files needing data removal treatment should be queued, populate a queue with the file, treat the file, wherein treating the file includes removing data from the file to create an updated file, and replace a previous version of the file in storage with the updated file.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates a high-level algorithm for queue implementation in accordance with some embodiments of the present technology.

Figure 1:
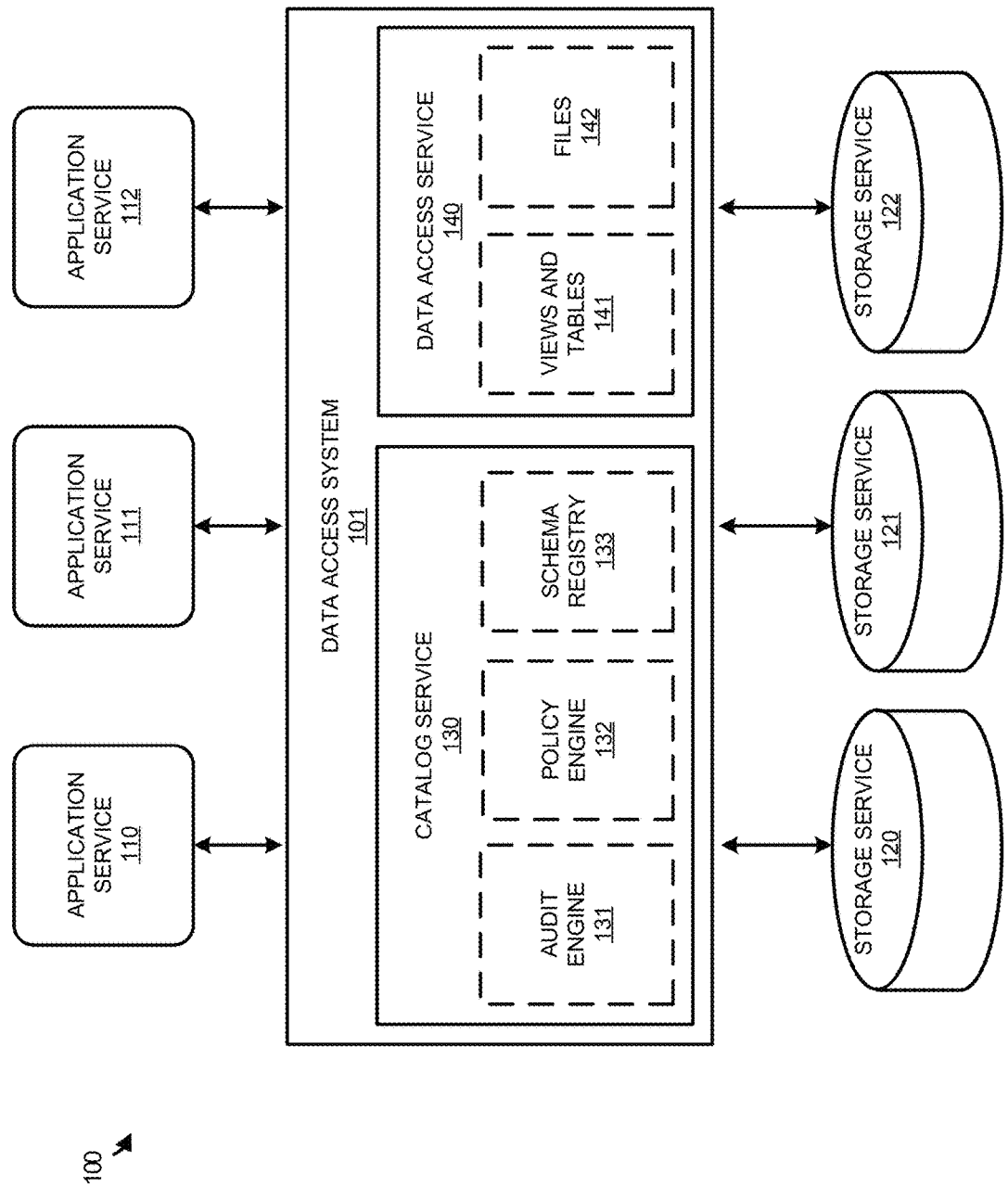
FIG. 1 illustrates a data access system for generating a data configuration in a multiple application service and multiple storage service environment in accordance with some embodiments of the present technology.

The drawings have not necessarily been drawn to scale. Similarly, some components or operations may not be separated into different blocks or combined into a single block for purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Heterogeneous, multi-vendor data platforms currently face many issues with opening data access for innovation while maintaining proper governance and compliance. Without the ability to scale governance, enterprises are limited in what they can do with new data platform technologies and run the risk of security and governance controls falling short of regulations. An active data access platform unifies and manages access for data consumers across multi-cloud, multi-datastore, and multi-tool environments. Tools such as Structured Query Language (SQL), Python, Spark, MapReduce, and R apply machine learning and analytics to data. Infrastructures such as S3, Azure, Hadoop Distributed File System (HDFS), and on-premise databases serve as repositories for massive amounts of data. New compute and storage solutions are introduced constantly.

An effective data access platform enables a company to maintain accessibility, visibility, and security of data throughout the entire platform. However, when each solution has its own catalog, access controls, and auditing capabilities, data-driven organizations face issues achieving and maintaining these goals. In order to preserve agility, these organizations benefit from the ability to control fine-grained access to specific datasets, support a growing array of analytics tools, and capture detailed audit logs for usage insight and regulatory compliance.

Both the European Union's General Data Protection Regulation (GDPR) and the California Consumer Privacy Act (CCPA) impose strict guidelines when collecting, maintaining, and using consumer data, and a data access platform should provide the necessary controls to adhere to these guidelines thereby setting an enterprise up for future success. It is of great importance to adhere to the GDPR, CCPA, and other regulations throughout the entire lifecycle of data. Through various filtering capabilities, blacklists and whitelists can be created to help manage sensitive data. A regulation-compliant platform can enable data owners and stewards to define roles that control access to data while allowing user consent changes to be handled quickly.

GDPR has four basic requirements that must be addressed by any company storing customer data. First, any customer must be allowed to request and view all data a company has about him or her, including derived data the company may have compiled on the individual's behavior and engagement. Companies must be able to provide the requested data to customers in a portable format. Secondly, GDPR requires that all data processors and data controllers implement privacy by design in their systems and do their best to protect Personally Identifiable Information (PII). Third, a company must notify its designated Data Protection Authority within 72 hours of discovering a data breach and must also inform its data subjects. Lastly, any customer may request the removal of his or her data including profile information, transactional history, and the customer's digital trail. Thus, the GDPR requires an organization with access to lots of customer data be able to effectively protect customer data, retrieve customer information and present it in a timely and portable fashion, respond to a "right to be forgotten" request, and have an overall GDPR-compliant data architecture. Additionally, user data for customers that wish to be forgotten must be physically deleted at the storage level.

Thus, embodiments of the present technology relate to background maintenance of datasets, specifically scoped to satisfy the physical delete GDPR requirement for storage systems such as S3, HDFS, and similar storage systems. The physical delete requirement requires that user data be physically deleted at the storage level. The physical layer consists of storage in raw format as files on databases such as S3, HDFS, RDBMS, or similar databases. Physical deletion can mean rewriting data with new data to be completely anonymized (e.g., tokened, noise added, etc.) or removing data entirely. Embodiments of the present technology use treatment to capture both of these cases—deleting or rewriting. Any physical treatment includes rewriting the datasets stored on disk. The physical deletes do not need to be completed instantaneously, as this would be impossible, but must happen within some time bound to comply with regulations.

For small datasets, performing these transformations, deleting or rewriting, is simple with existing tools such as Spark or Hive, for example. However, these simple functions transform into an operational nightmare as datasets become large. Performing the physical treatment for large datasets, which often are the datasets that require treatment as they capture user activity, can take multiple weeks or longer to run to completion and the maintenance treatment must happen continuously. New records may need to be marked for treatment every day. The combination of needing to run these actions continuously, the compute resources required, and the time needed to treat large datasets makes these processes extremely difficult to operationalize. Challenges within these operations include cost, difficulties handling failures for jobs that run for multiple weeks, issues with consistency, and complexity in scheduling jobs.

Thus, a feature that enables an access platform to automatically perform these operations, removing operational and performance management burden from the user, is disclosed. The present technology, in some embodiments, advantageously removes the need for a user to schedule logical deletes such that a user only needs to specify the treatment transformation (via SQL, in some examples) and the maximum staleness (oldest record that is not treated), enabling clean-up to be handled in the background as the system continues to run.

Background file maintenance, also referred to as compactions or view maintenance, is a common feature of databases and is generally completely handled by the database. A data access platform, in general, may augment non-database storage systems such as S3 to provide richer database-like functionality. The common supported storage systems are considered immutable, i.e., there is no way to remove an arbitrary record from a file without rewriting the entire file. The immutability of these records may be due, at least in part, to the storage system itself being immutable or the file format being immutable (e.g., the file is completely compressed). Due to these limitations, the file is considered to be the atomic unit—the entire file must be replaced with a new one that is treated. Large datasets typically consist of many (i.e., thousands, hundreds of thousands, or more) files.

The Hadoop compute frameworks (i.e., Hive, Spark, etc.) can express the physical treatment of files using INSERT OVERWRITE. This works very well for small datasets but is the source of the operational difficulties at larger scales. For example, if the fact_tbl is small, a user can easily solve this problem by periodically running an INSERT OVERWRITE fact_tbl SELECT*FROM fact_tbl_secure, command to rewrite the entire dataset in place and, if the dataset is small enough, it completes quickly (i.e., within a few hours) and this solution works well. A user may, for example, run this table rewrite command every two weeks.

However, if the fact_tbl is very large (i.e., 10 sTB+) then performing a table rewrite command is prohibitively difficult. In some cases, rewriting the entire table may table over two weeks, thereby making it impossible to satisfy the two-week staleness requirement. Additionally, the operation needs to continuously run (i.e., background maintenance) and scheduling this rewrite command (i.e., INSERT OVERWRITE) to run continuously back to back is not feasible. INSERT OVERWRITE commands may require transactional semantics, wherein either the table is entirely rewritten or not at all rewritten. This requirement prohibits achieving the desired result of continuous, file-by-file updating. By eliminating these transactional semantics, operational simplification can be achieved.

FIG. 1 illustrates computing environment 100 for operating a data access system according to some embodiments. Computing environment 100 includes data access system 101, application services 110-112, and storage services 120-122. Data access system 101 is an example of a modular data access system described herein and includes catalog service 130 and data access service 140 that may execute on one or more physical computing systems. The one or more computing systems may include desktop computing systems, server computing systems, or any other similar physical computing system capable of providing a platform for data access system 101. Data access service 140 includes views and tables 141 and files 142. Catalog service 130 includes audit engine 131, policy engine 132, and schema registry 133. Catalog service may also be implemented as a metadata service, in some examples, and may include fewer modules or modules in addition to the engines and registry shown in the present example.

Data access service 140 may apply schema, access policies, and other transformations including but not limited to Universal Disk Formats (UDFs), pseudonymization, and masking to data as well as perform input/output functions and provision data to various analytics tools. Data may be provisioned for a user in a useful, consumable manner. Views and tables 141 comprise structured data that may be presented to a user with a familiar abstraction of views and tables 141. Files 142 comprises unstructured data that is consumed in the form of file formats that may be requested by a user. Data access service 140 may include functionality for and interact with several types of retrieval, streaming, and analytics tools including but not limited to Spark, Python, SQL engines, Notebooks, and business intelligence (BI) tools such as Tableau, Microsoft Power BI, and Microsoft Excel.

Catalog service includes audit engine 131. In some examples, audit engine 131 provides a user with a detailed view of information related to their data. The information provided by audit engine may include but is not limited to user activity, popular datasets, and commonly used tools.

Policy engine 132 provides functionality for defining and managing data access policies that can be applied as data is accessed without interrupting service. The policies in policy engine 132 may be defined and applied at several different granularities including database, dataset, rows, columns, and cells. In some embodiments, policy engine 132 includes role-based access control (RBAC) wherein permissions are based on roles, or personas, needing to perform specific, data-centric tasks. RBAC may be combined with Identity and Access Management (IAM) systems, such as Lightweight Directory Access Protocol (LDAP) based directories, to tie user groups into the role-based permissions, in an example. Policy engine 132 may implement data obfuscation for differential privacy wherein sensitive data may be dynamically protected using obfuscation functions including but not limited to anonymization, pseudonymization, redaction, and masking.

Schema registry 133, in some examples, is an automated schema registry that automatically discovers, stores, and queries technical and operational metadata on datasets available to data consumers. Schema registry 133 is responsible for storing platform-wide dataset metadata, in some examples, wherein policy engine 132 controls access to those datasets. Schemas, dataset sizes, ownership, tags, annotations, and basic quality metrics may be some of the information contained within schema registry 133, in addition to other information. Users and applications may access schema registry 133 via various application programming interfaces (APIs) and/or graphical user interfaces (GUIs). Schema registry 133, in some implementations, serves as a central schema registry shared across multiple analytics tools.

In operation, data access system 101 may perform background maintenance of datasets, specifically scoped to satisfy the physical delete GDPR requirement for any of storage services 120-122 that may include S3, HDFS, or similar storage systems. Data access system 101 receives a treatment transformation and the maximum staleness (oldest record not treated) specified by a user (via SQL, in some examples) and subsequently completes the transformation of physically deleting all necessary records within the time limit.

Figure 2:
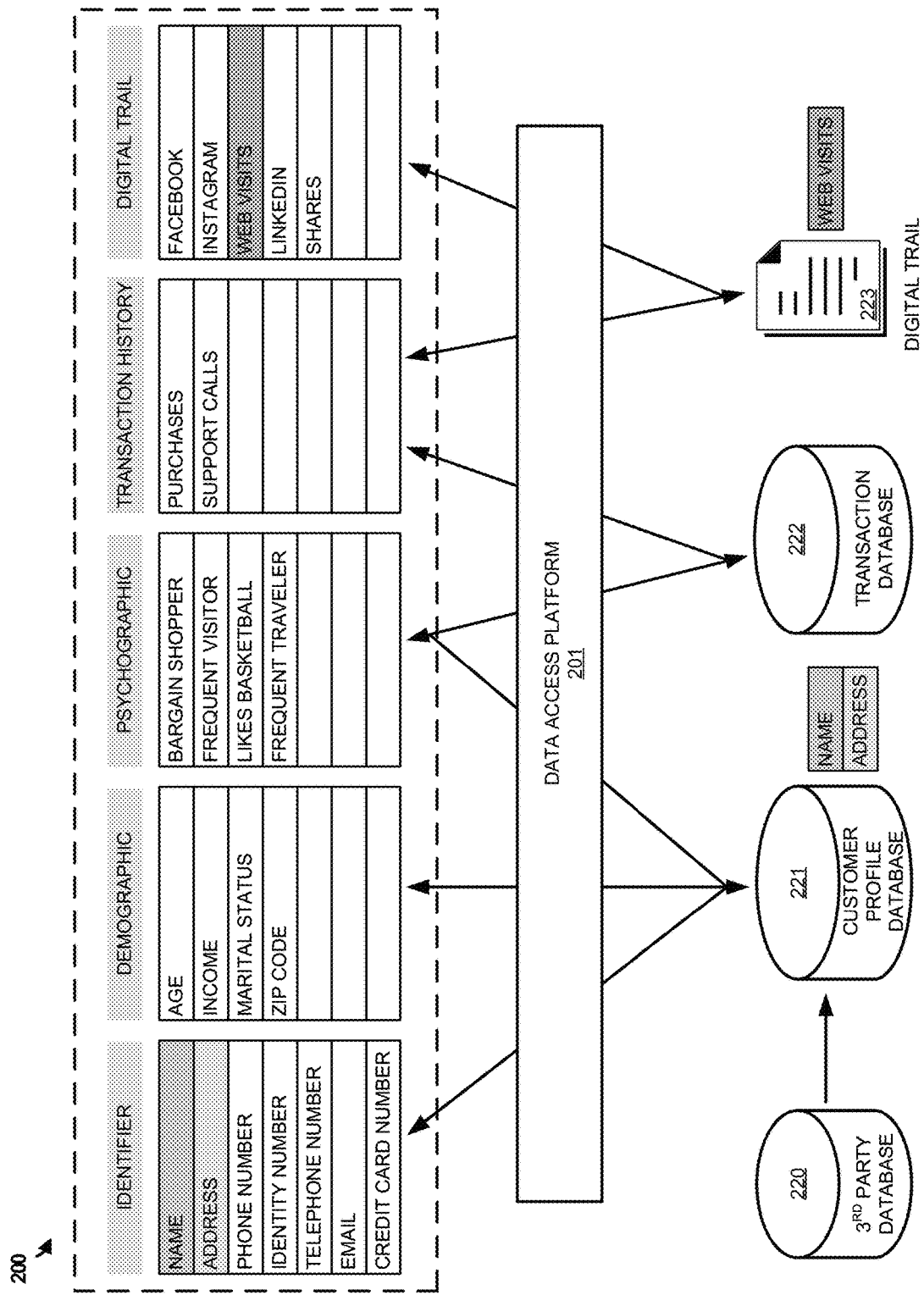
FIG. 2 illustrates an example of a data access platform within a computing environment as it relates to records spread across one or more locations in accordance with some embodiments of the present technology.

FIG. 2 illustrates an example of data access platform 201 within computing environment 200 as it relates to records spread across one or more locations. FIG. 2 includes data access platform 201, 3$^{rd}$ party database 220, customer profile database 221, transaction database 222, digital trail 223, and several examples of data stored on a user within the databases. Types of data include identifiers, demographics, psychographics, transaction history, digital trails, and similar personally-identifying information. Identifiers may include name, address, phone number, identity number, telephone number, email, credit card number, and other identifiers. Demographics may include age, income marital status, and other demographics. Psychographics may include habits or traits of a user including bargain shopper, frequent visitor, likes basketball, frequent traveler, and similar psychographic traits. Transaction history may include purchases, support calls, and other interaction records. Digital trail may include Facebook, Instagram, web visits, LinkedIn, shares, and other digital information sources.

As demonstrated in FIG. 2, information on a user may be spread across many locations and stored in many different formats. In the present example, customer profile database 221 receives some or all of its data on a user from 3rd party database 220. Data in customer profile database may then be categorized in various manners such as identifiers, demographics, and psychographics, in some embodiments. Transaction database 222 may further include user data such as psychographics and transaction history. Digital trail 223 may include information such as a Facebook page, an Instagram account, previous web visits, LinkedIn page, and shared content.

In some embodiments, data access platform 201 unifies and organizes user data such that customer requests can be efficiently responded to. If a user requests to be forgotten from a system, data access platform 201 comprises mechanisms that enable all records of a user to be physically removed within a reasonable time period and for their account to be logically deleted instantaneously. Furthermore, data access platform 201 may comprise mechanisms that identify and protect PII permanently using attribute-based access control to tag pertinent PII data. Data access platform 201 may control granularity of access to secure data, maintain full audit trails, respond to customer consent management requests in real time, and automate responses to customer requests. Furthermore, in some implementations, data access platform 201 maintains flexibility in right-to-be-forgotten implementations by choosing between soft-delete, hard-delete, and anonymization when removing users from the system.

Figure 3:
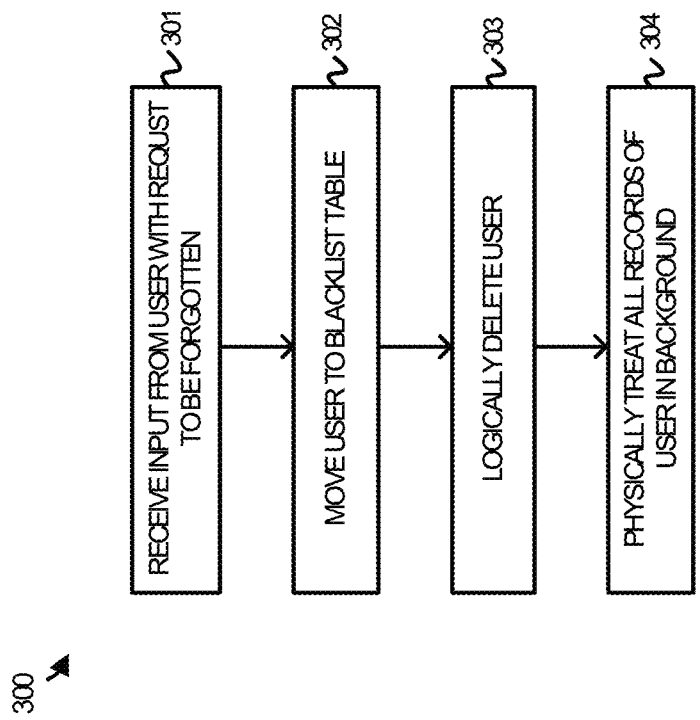
FIG. 3 illustrates a flowchart for initiating physical treatment of user records in accordance with some embodiments of the present technology.

FIG. 3 illustrates a flowchart in accordance with an embodiment of the present technology. In step 301, input from a user is received, wherein the input includes a request to be forgotten. Data for users that wish to be forgotten, in accordance with some regulations, must be physically deleted at the storage level. In certain embodiments, physical deletion at the storage level includes rewriting the data to be completely anonymized. Anonymization can be achieved via tokenization, adding noise, and similar methods. In other embodiments, physical deletion at the storage level includes removing the data entirely. In addition, embodiments of the present technology may be utilized to remove data without requests for complete data removal. For example, a user may wish to have certain data removed, be omitted from having private data shared, and other examples of partial data removal or exemption. Such embodiments are anticipated herein and can be accomplished in accordance with the present disclosure.

In step 302, the user is moved to a blacklist table. For example, if the treatment is to remove all records for users stored in a blacklist table, a user is added to the blacklist table upon requesting to be removed. In some implementations, transformation can be expressed in SQL with LEFT ANTI JOIN or similar command. Step 302, in other embodiments, may not include moving a user to a blacklist table, but may including flagging a user in an alternative manner as needing to be removed. In some examples, flagging a user may include notifying the system that a user has requested to be removed.

In step 303, the user is logically deleted from the system. In some examples, logical delete is completed immediately, or nearly immediately, without the need to schedule the logical delete. For example, if a user is added to the blacklist, subsequent queries omit the user. Logical deletion, or soft deletion, does not include physically removing the user from the database. Instead, logical delete includes marking an entity as deleted, such as moving the user to a blacklist, rather than physically deleting the user. Thus, logically deleted data remains in one or more databases within the system, but is left out from searches, comparisons, queries, and the like.

Lastly, in step 304, all records of the user are physically treated in the background. Physical treatment may occur continuously in some examples. Upon successful completion, no parts of a dataset contain data about the user they should not after a specified, or required, time window. In some examples, physical deletion may not successfully complete within the time window. In an embodiment, the system may notify an administrator (or any similar user) that it was unable to complete physical deletion within the specified time frame or that it predicts it will be unable to complete physical deletion within the specified time frame. Physical treatment will be discussed further with respect to FIGS. 5, 6, and 7.

Figure 4:
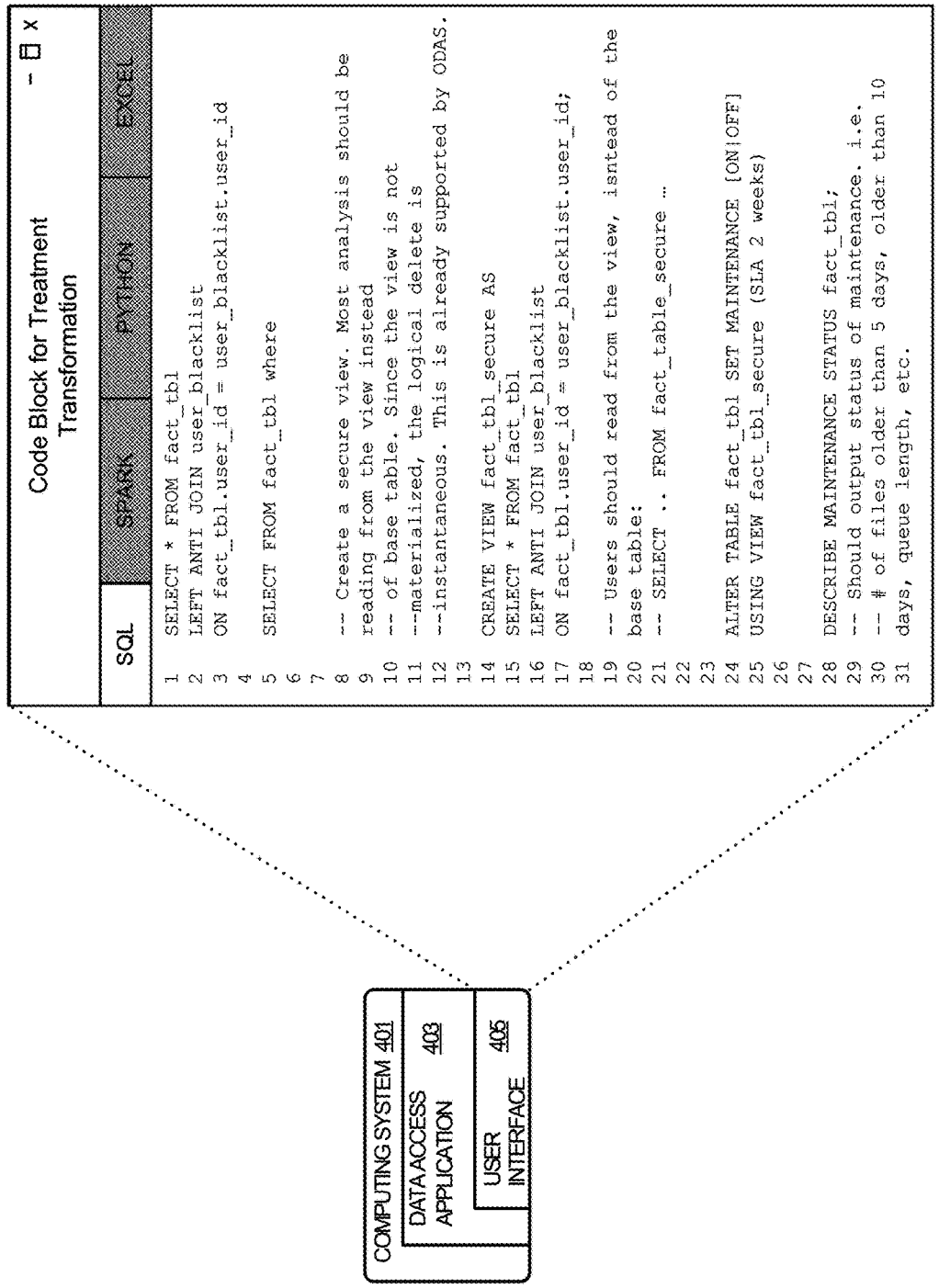
FIG. 4 illustrates a code block for a treatment transformation in accordance with some embodiments of the present technology.

FIG. 4 illustrates a code block for initiating the removal of a user within a data access system. FIG. 4 includes computing system 401, data access application 403, and user interface 405. In the present embodiment, the specified treatment is to remove all records of the user. Once the user has been flagged as needing to be removed, or put on a blacklist table in some examples, the transformation can be expressed in SQL, as shown in code block 410. For example, the query illustrated in lines 1-5 of code block 410 may return rows from a fact table for users that do not exist in the blacklist (i.e., users that want their data removed). Logical delete and physical treatment may be accomplished via a series of metadata commands as shown in lines 8-21 of code block 410. Lines 24-25 of code block 410 provide an example of how a user may enable background maintenance on the fact table. Furthermore, lines 28-31 provide an example of an optional command to query for the state of the table. By implementing the commands described in FIG. 4, an ENABLE MAINTENANCE command or similar can allow for the fact table to be continuously physically treated, and no other action must be taken from a user after implementing the command. As new users are then added to the blacklist, the data access service performs physical deletion of their user data within the specified time window (e.g., two weeks).

The environment, syntax, and examples provided in FIG. 4 and code block 410 are used only as examples to show intent and may be implemented in a variety of different manners. In an embodiment, the same view definition for logical delete may be used to specify the transformation for physical treatment. The Data Definition Language (DDL) allows for control over the maximum staleness of a treatment. Additional options may be included to control other behavior.

Figure 5:
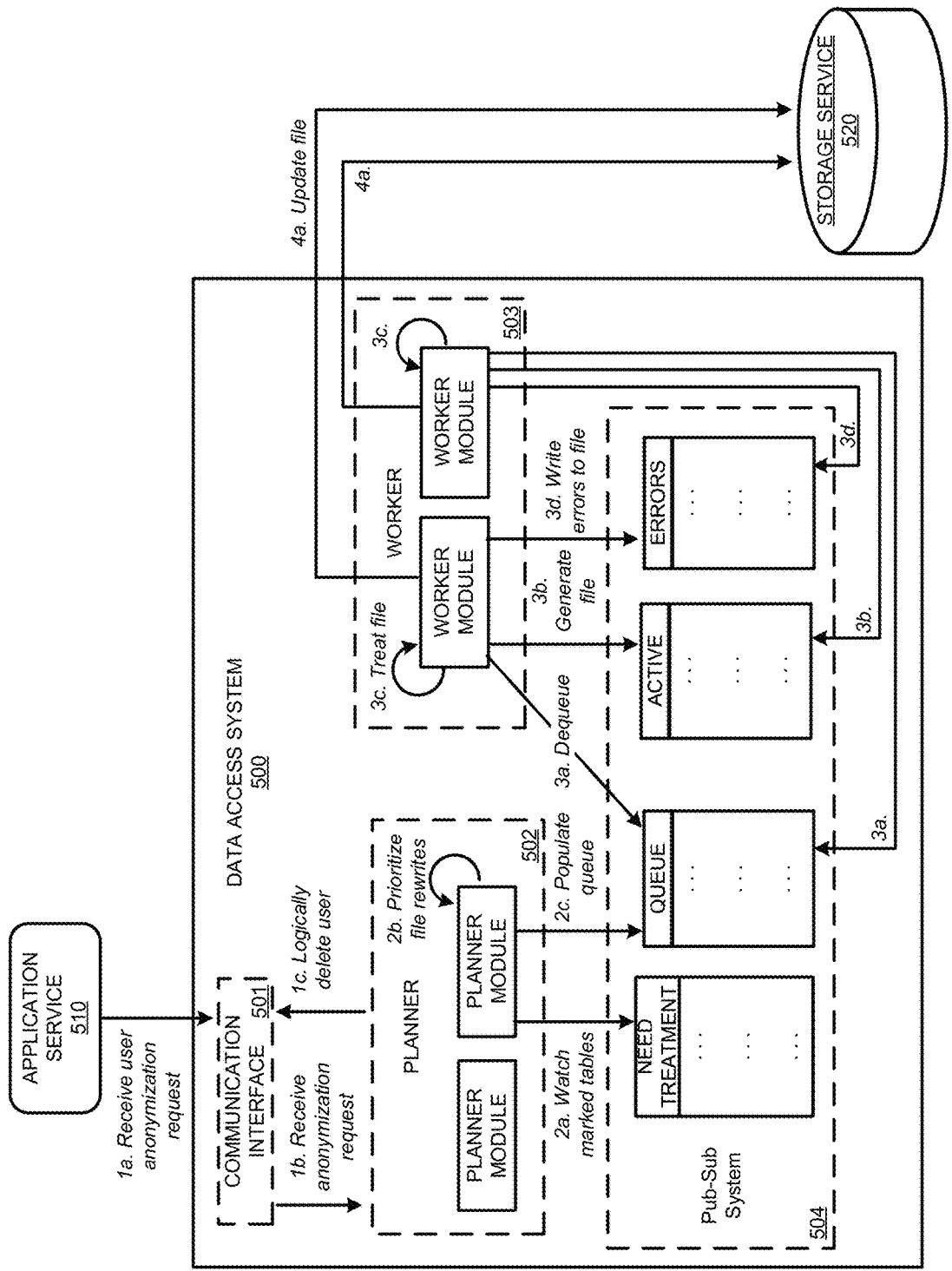
FIG. 5 illustrates an overview of physically removing data during background dataset maintenance in a multiple application service and multiple storage service environment in accordance with some embodiments of the present technology.

FIG. 5 illustrates an overview of physically deleting users from a storage system and includes data access system 500, application service 510, and storage service 520. Application service may be many different types of application services including spreadsheet applications, Python, Spark, electronic record applications, native big data APIs, Java Database Connectivity (JDBC), PyOkera, REST, OkeraFS, and other application services. Storage service 520 may be many different types of storage services including S3, HDFS, Kafka, DynamoDB, Relational Database Management System (RDBMS), and other data storage services. Furthermore, data access system 500 may communicate with, interact with, and maintain multiple application services and/or multiple storage services. Additional application services and storage services are omitted from the present example for purposes of clarity. Data access system 500 includes communication interface 501, planner system 502 comprising multiple planner modules, worker system 503 comprising multiple worker modules, and pub-sub system 504 (i.e., publish-subscribe system 504). Pub-sub system 504 comprises tables including but not limited to NEED TREATMENT, QUEUE, ACTIVE, and ERRORS. In some examples the pub-sub system may comprise Zookeeper or similar software capable of performing the tasks described herein. As shown in FIG. 5, data access system 500 is capable of receiving anonymization requests from an application service.

Overall, the background dataset maintenance performed by data access system 500 includes two main components. The first component, the data transformation path, includes reading a file, treating the file, and rewriting the file. The data transformation path occurs on the worker modules (i.e., workers) in worker system 503. The workers of the present embodiment already include functionality for reading storage and applying transformations, as they include the same view as what they already evaluate in data access system 500. The workers may also already include implementation to write to common file formats. Furthermore, the workers may already have capabilities for file granularity, as a worker is already assigned a subset of files to process. The workers solely work to get the next work item, process it, and write it back, reporting errors as necessary for the planner to pick up. How many threads in each worker are sitting in the work loop can be configured to control how many resources the worker can spend on background maintenance versus other tasks such as servicing user queries.

The second component, orchestration, includes orchestrating while files get processed, how they are processed, and how often they are processed. The planner-worker combination system can be viewed as a single producer, multiple consumer problem, wherein the single producer, planner system 502, queues work based on tables that have been marked as needing treatment and their configured staleness tolerance. Planner system 502 manages prioritizing when files need to be rewritten and reporting when the system is falling behind and may be unable to meet deadlines.

As described herein, at step 1a, removal of a user begins when data access system 500 receives a user anonymization request from application service 510. The request may be received at communication interface 501 of data access system 500. In some examples, communication interface 501 is an ODBC connector. The request may be transferred from communication interface 501 to planner system 502 within data access system 500. For example, a user may request, within an application service, to be entirely forgotten from a system, or to have a subset of data removed or changed. The system herein may use the process described in FIG. 5 or a similar process to remove or change data within a system. Any user or customer may initiate a user anonymization request.

Next, in step 1b, the anonymization request is transferred from communication interface 501 to planner system 502 within data access system 500. The planner queues work based on the tables that have been marked as needing treatment and the configured staleness tolerance. The planner does not just queue all of the files needing treatment at all times. Instead, the planner manages and prioritizes when files need to be rewritten. These managements and prioritization tasks include, in some examples, leaving the queue empty when there are no pressing deadlines. The planner may also include reporting capability such that it reports when the system is falling behind. In some examples, the system may be considered falling behind when there is no way to meet a staleness requirement based on cluster size and data volume. In other examples, the planner may report at other times, such as before it has reached an inability to meet requirements. In step 1c, the user is logically deleted from the system, such that the user is omitted from subsequent queries. Logical delete occurs instantaneously in some examples.

In step 2a, the planner module presently operating watches tables marked as needing treatment. A table may be marked as needing treatment when a user requests anonymization. In step 2b, the planner prioritizes file rewrites. As previously discussed, the planner is responsible for managing and prioritizing files needing treatment and does not solely move files to the queue upon being marked as needing treatment. In step 2c, the planner populates the queue accordingly. In the present embodiment, only one planner may be populating the queue at a time. By preventing multiple planners from populating the queue, a multi-master configuration is avoided in which the same files are added to the queue by different planners. However, if the same file is added to the queue too often, the work performed is wasted but everything remains correct, i.e., failover scenarios do not cause incorrect data treatment or file updating.

In step 3a, a worker from worker system 503 dequeues a task from the queue. Multiple workers may be working at a time and performing treatment actions. In some embodiments, the queue is a directory that planners write to and workers watch and delete from. In step 3b, a worker generates a new file that is then actively treated. The worker writes the file and related information to another directory (e.g., "active") after dequeuing the task. The directory indicates that the file is actively being treated. The directory exists in pub-sub system 504 in the present example. Pub-sub system 504 includes primitives for leases such that if a worker dies, the system deletes the file so that it is no longer being actively treated. In step 3c, a worker module works on treating the file. During treatment, the worker writes errors, if and when they occur, to another directory in pub-sub system 504, as shown in step 3d. Any errors may then be consolidated by the planner. In step 4a, an updated file is published to storage service 520. In some embodiments, upon publishing the updated file to storage service 520, the old version of the file is removed or deleted. In other embodiments, files may be published with updated names, timestamps, and the like to indicate most recent versions. Upon completion, workers report success in the system of truth (i.e., storage service 520) as the modified time on the file and/or the file naming convention, in certain embodiments. This method of reporting allows the system to be more robust to failures or errors.

Throughout the user anonymization process described in reference to FIG. 5, the property is maintained that planners and workers do not make remote procedure calls (RPCs) to one another thereby simplifying scaling and fault tolerance (i.e., errors from workers cannot be lost). Furthermore, the design presented in FIG. 5 allows for multiple workers to be treating the same file at the same time. Although it would be inefficient for multiple workers to be treating the same file at the same time, it is possible and maintains correctness in the system. The system is thereby decoupled and requires less coordination burden, particularly if the planners restart. It is anticipated in the present embodiment that various metrics be included in the workers to understand the amount of resources spent on these background maintenance tasks. The metrics therein may be inspectable by an end user to guide cluster scaling requirements.

In certain storage services, atomic rename is unsupported, causing replace file actions to not be implemented with perfect consistency. However, data access system 500 can be configured to maintain an acceptable level of consistency and eventual consistency can be achieved. In some embodiments, the intermediate file may be produced locally and the file in the storage service, such as S3, is replaced when the entire new file is produced, thereby minimizing the window in which inconsistency can occur. In some examples, the new file, upon completion, is put into the storage service in the place of the previous file. Alternatively, in some examples, the new file may be inserted into the storage service as a file with a derived name with a version suffix.

For example, if the original file is named "data.parquet," a file named "data.1parquet" may be produced as the updated version. Subsequently, the next updated version may be titled "data.2.parquet." In certain embodiments, the planner may be responsible for deleting older versions after a configured time period (e.g., one hour) to allow existing jobs to finish. The configured lease time may be the expected maximum duration for processing a single file (not a whole task). To prevent duplicate data, when the planner enumerates files, it will be able to pick the latest version. Thus, existing in-flight jobs may use the old version and future jobs may use the new version. After the configured lease time, old files may be removed. In addition to addressing the consistency issue, the generational identification provided in the numbered version can be useful for debugging purposes.

In the event of an entire cluster failure (e.g., all the ec2 machines are deleted) or cluster restart, the design disclosed herein may pick back up upon failure. The work may be recreated and thus requeued when a new planner comes on and the workers may continue. Thus, work done by the planners (to populate the queue) and workers treating files that are not updated may be lost, but the work may be completed upon restarting the task. In the event of a pub-sub system failure, the queue may be lost. However, when the system comes back on, a new leader (i.e., planner) may be elected and the background processes may continue. Because the data within the pub-sub system is soft-state, all the states in the pub-sub system may be recreated. If the leader planner fails, a new leader planner may be elected to start populating the queue. It is possible, in this scenario, that the new planner queues redundant files, but if a file is updated multiple times as a result of this, no correctness issues are created. In some embodiments, the new planner may asses—the current work queue to determine what files to skip to optimize the process. Furthermore, a worker failure may occur when a worker signed up to process a file never finishes. Since workers write to externally observable states twice, failures may occur in between those writes which capture all of the processing. Thus, worker failure is naturally handled by the planner, which may observe that the file has not been updated (e.g., based on timestamp) next time it goes through a work queueing loop and subsequently requeue it.

In addition to physical treatment of files, as described in reference to the above figures, the framework disclosed is useful for and anticipated to be used for several alternative purposes. Alternative purposes include but are not limited to the automatic conversion of files, merging files, splitting files, fixing data errors due to schema evolution, leveraging improvements in storage format specifications, and additional changes or alterations to files. Furthermore, the system may be leveraged to include additional features such as writing to other storage systems and other file formats, triggering immediate treatment of files, and the ability to be transparent to all clients when directly reading from storage.

Figure 6:
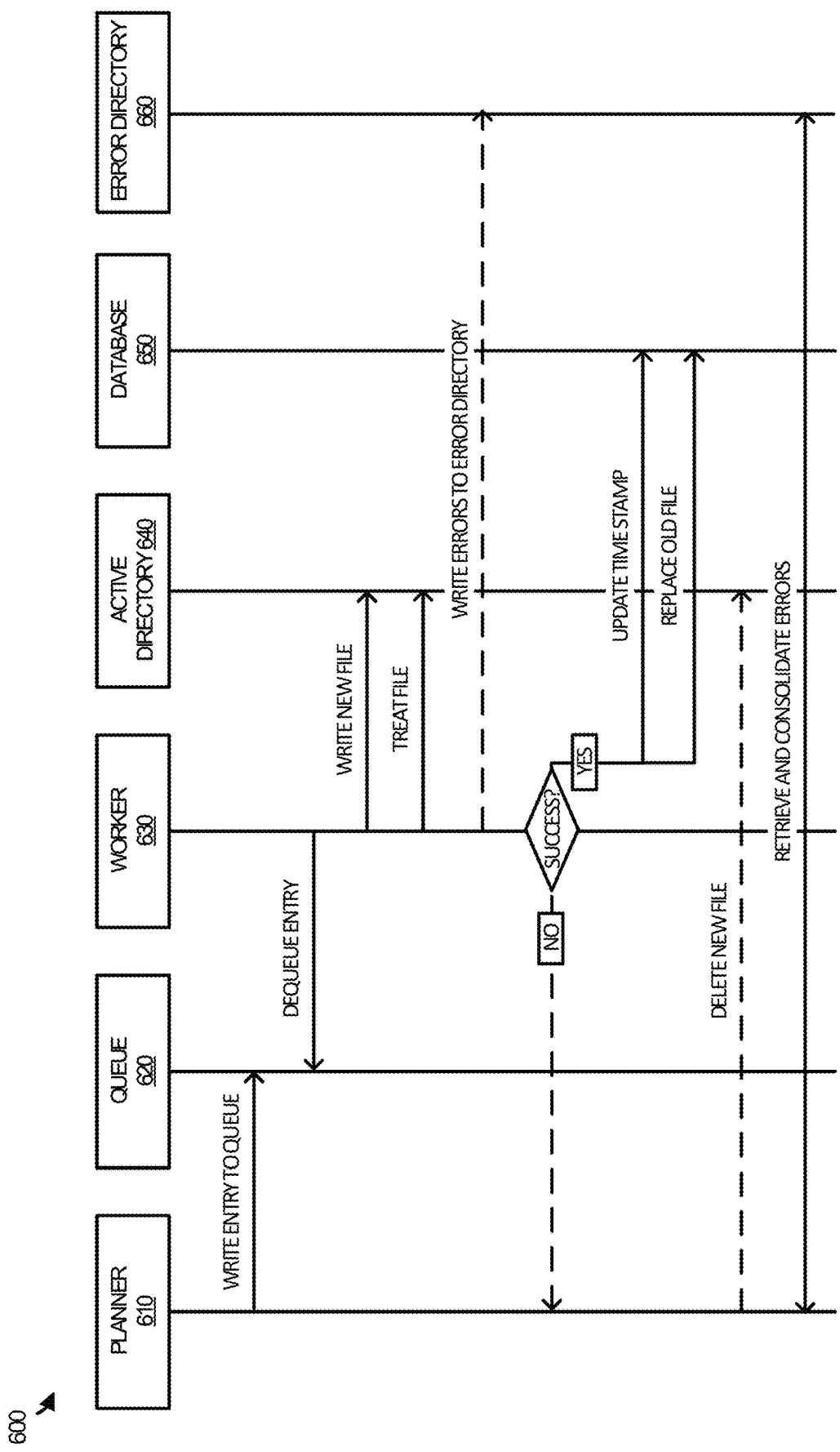
FIG. 6 illustrates a sequence diagram for the physical removal of data from a database in accordance with some embodiments of the present technology.

FIG. 6 illustrates sequence 600 for physically removing users from a database in accordance with some embodiments of the present technology. Sequence 600 includes operations between planner 610, queue 620, worker 630, active directory 640, database 650, and error directory 660. As a first step, planner 610 writes an entry to queue 620. Worker 630 may then begin treatment of the file entered to the queue by dequeuing the entry. Worker 630 subsequently writes a new file and treats the file. In the present example, the new file is written to active directory 640. In certain implementations, the new file is written to a temporary directory within a pub-sub system such as ZooKeeper. In other implementations, the active new file may be written to a database or an alternative location. During file treatment, worker 630 writes any errors to an error directory, which may also be located within the pub-sub system or an alternative location. If the worker completes the job, thereby successfully completing the task, the file is updated in database 650 including updating a time stamp and replacing the old file. Replacing the previous file may occur in several different manners including directly replacing the file with the new one upon putting the new file in the database or creating a new file in addition to the previous file, wherein the previous file may then be removed at a later time.

During treatment of a file, worker 630 writes any errors that occur during treatment to error directory 660. Throughout the process, planner 610 may retrieve and consolidate errors from error directory 660. If file treatment fails, or is unsuccessful, planner 610 may, in some implementations, delete the new file from active directory 640. The file may then later be written to the queue again by the same planner or by an alternative planner.

FIG. 7 illustrates a high-level overview of queue implementation and file treatment for physically removing data in a multiple application service and multiple storage service environment. The queue may be implemented as a directory that planners write to and workers watch and delete from. As previously discussed, the planner queues work based on the tables that have been marked as requiring treatment and configured staleness tolerances. In some embodiments, the staleness tolerance may be two weeks in accordance with GDPR requirements. As exemplified in lines 3-9 of code block 710, each worker dequeues tasks from the queue and creates a new file in a directory containing active files. A transformation is performed on the file to update it with the necessary information or to remove information, such as user data. The updated file may then be used to replace the previous file in its respective database. The active file may then be removed from the active directory. As illustrated, the workers simply continue to process the next work item as long as the queue is populated. The workers then process the file and write it back, reporting errors as necessary for the planner to pick up. How many threads in each worker waiting in the work loop may be configured to control how many resources that worker can spend on background maintenance as opposed to other tasks such as servicing user queries.

Lines 11-16 of code block 710 illustrate an example of a planner process. The planner first identifies tables needing maintenance and determines what should be queued based on the staleness requirement. The staleness requirement may be specific to a specific file, a specific table, a specific database, a specific application, or a specific system requirement. If a file is determined as needing to be queued, the planner adds the file to the queue so that it can undergo a maintenance transformation performed by a worker module. The planner does not just queue all files needing maintenance but instead prioritizes when files need to be rewritten. At times, a planner may leave the queue empty when there are no pressing deadlines, allowing workers to work on other tasks such as responding to user queries. The planner may also report when the system is falling behind (i.e., with the cluster size and data volume, there is no way to meet the staleness requirement). The environment, syntax, and examples provided in FIG. 7 and code block 710 are used only as high-level examples to show intent and may be implemented in a variety of different manners.

Figure 8:
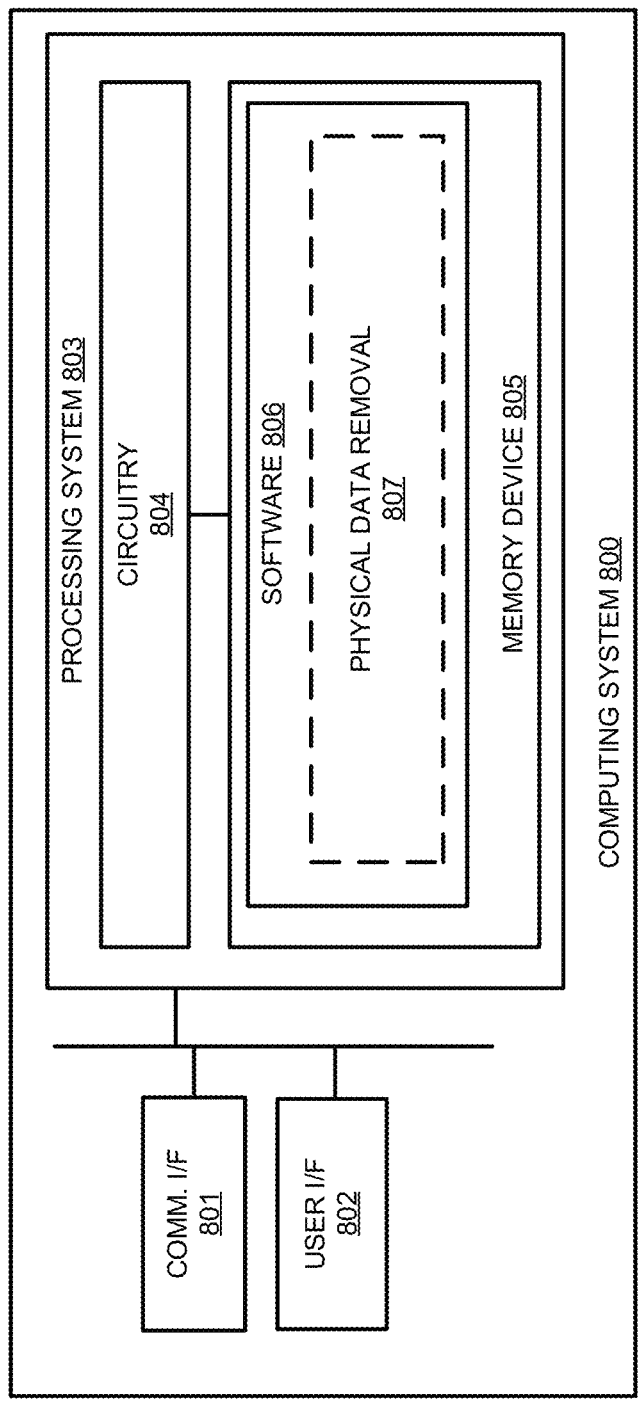
FIG. 8 illustrates a computing system for physically removing data in a multiple application service and multiple storage service environment in accordance with some embodiments of the present technology.

FIG. 8 illustrates computing system 800 to perform background dataset maintenance including physical deletion of data in a multiple application service and storage service environment according to one implementation. Computing system 800 is representative of any computing system or collection of systems with which the various operational architectures, processes, scenarios, and sequences disclosed herein for the physical removal of data may be employed. Computing system 800 is an example of data access system 101 from FIG. 1, data access platform 201 from FIG. 2, and data access system 500 from FIG. 5, although other examples may exist. Computing system 800 may be implemented as a single apparatus, system, or device or may be implemented in a distributed manner as multiple apparatuses, systems, or devices.

Computing system 800 comprises communication interface 801, user interface 802, and processing system 803. Processing system 803 is linked to communication interface 801 and user interface 802. Processing system 803 includes processing circuitry 804 and memory device 805 that stores operating software 806. Computing system 800 may include other well-known components such as batteries and enclosures that are not shown in the present example for clarity. Examples of computing system 800 include, but are not limited to, desktop computers, laptop computers, server computers, routers, web servers, cloud computing platforms, and data center equipment, as well as any other type of physical or virtual server machines, physical or virtual routers, containers, and any variation or combination thereof.

Processing system 803 loads and executes software 806 from memory device 805. Software 806 includes and implements process 807, which is representative of the physical deletion background dataset maintenance processes discussed with respect to the preceding figures. When executed by processing system 803 to provide dataset maintenance, software 806 directs processing system 803 to operate as described herein for at least the various processes, operational scenarios, and sequences discussed in the foregoing implementations. Computing system 800 may optionally include additional devices, features, or functionality not discussed for purposes of brevity.

Referring still to FIG. 8, processing system 803 may comprise a micro-processor and other circuitry that retrieves and executes software 806 from memory device 805. Processing system 803 may be implemented within a single processing device but may also be distributed across multiple processing devices or sub-systems that cooperate in executing program instructions. Examples of processing system 803 include general purpose central processing units, graphical processing units, application specific processors, and logic devices, as well as any other type of processing devices, combinations, or variations thereof.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus, including combinations thereof. User interface 802 may be omitted in some examples.

Memory device 805 may comprise any computer-readable storage media readable by processing system 803 and capable of storing software 806. Memory device 805 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer-readable storage media a propagated signal.

In addition to computer-readable storage media, in some implementations memory device 805 may also include computer-readable communication media over which at least some of software 806 may be communicated internally or externally. Memory device 805 may be implemented as a single storage device but may also be implemented across multiple storage devices or sub-systems co-located or distributed relative to each other. Memory device 805 may comprise additional elements, such as a controller, capable of communicating with processing system 803 or possibly other systems.

Software 806 (including process 807) may be implemented in program instructions and among other functions may, when executed by processing system 803, direct processing system 803 to operate as described with respect to the various operational scenarios, sequences, and processes illustrated herein. For example, software 806 may include program instructions for implementing a physical data removal process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 806 may include additional processes, programs, or components, such as operating system software, virtualization software, or other application software. Software 806 may also comprise firmware or some other form of machine-readable processing instructions executable by processing system 803.

In general, software 806 may, when loaded into processing system 803 and executed, transform a suitable apparatus, system, or device (of which computing system 800 is representative) overall from a general-purpose computing system into a special-purpose computing system customized to provide a multiple application service and storage service environment comprising physical data removal and background dataset maintenance as described herein. Indeed, encoding software 806 on memory device 805 may transform the physical structure of memory device 805. The specific transformation of the physical structure may depend on various factors in different implementations of this description. Examples of such factors may include, but are not limited to, the technology used to implement the storage media of memory device 805 and whether the computer-storage media are characterized as primary or secondary storage, as well as other factors.

For example, if the computer readable storage media are implemented as semiconductor-based memory, software 806 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface 801 may include communication connections and devices that allow for communication with other computing systems (not shown) over communication networks (not shown). Examples of connections and devices that together allow for inter-system communication may include network interface cards, ports, antennas, power amplifiers, radio frequency (RF) circuitry, transceivers, and other communication circuitry. The connections and devices may communicate over communication media to exchange communications with other computing systems or networks of systems, such as metal, glass, air, or any other suitable communication media. Communication interface 801 may be configured to use Time Division Multiplex (TDM), Internet Protocol (IP), Ethernet, optical networking, wireless protocols, communication signaling, or some other communication format, including combinations thereof. The aforementioned media, connections, and devices are well known and need not be discussed at length here.

Communication between computing system 800 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a data access system for data processing environments comprising multiple application services and multiple storage services, the method comprising:
   receiving, from a user, a request of a data treatment for anonymizing or removing user data;
   obtaining a staleness tolerance requirement for performing the data treatment based on a privacy policy;
   maintaining a list of data instances in a set of files of a table, wherein a data instance is associated with the request of the data treatment;
   identifying one or more files, stored in a storage service of the multiple storage services, needing the data treatment for anonymizing or deleting one or more data instances in a file of the one or more files based on the request, wherein the one or more files are associated with the data instances in the list, wherein the storage service includes an immutable storage system;
   determining whether a staleness of the file meets the staleness tolerance requirement for performing the data treatment;
   in response to the staleness of the file meeting the tolerance requirement,
   adding the file to a queue maintained in the data access system by a planner, wherein only the planner adds to the queue when the file is added to the queue, wherein the queue is shared by a plurality of workers in the data access system and queues tasks for the workers for performing the data treatment, each file in the queue is accessible by each of the plurality of workers, and each worker proceeds to dequeue the tasks from the queue sequentially;
   prioritizing the file over a second file in the queue, the file having a sooner deadline based on the staleness tolerance requirement than a second deadline of the second file based on a second staleness tolerance requirement for the second file, wherein the deadline for the file is a deadline to perform the data treatment within the staleness tolerance requirement specified in the privacy policy;
   after adding the queue with the file, dequeuing the file from the queue and treating the file by at least one worker of the plurality of workers, wherein treating the file includes the at least one worker anonymizing or deleting the file to create a new file; and
   replacing a previous version of the file in the storage service with the treated new file.

2. The method of claim 1, wherein adding the file to a queue maintained in the data access system comprises:
   prioritizing a third file over a fourth file in the queue, the third file needing a data anonymization treatment and the fourth file needing a data removal treatment.

3. The method of claim 1, wherein anonymizing user data comprises applying one or more of obfuscation, anonymization, pseudonymization, redaction, and masking to the user data.

4. The method of claim 3, further comprising, upon receiving the user anonymization request, logically deleting a user, wherein logically deleting the user comprises omitting the user from subsequent queries.

5. The method of claim 1, wherein:
   identifying one or more files needing the data treatment is based on a blacklist table; and
   users are added to the blacklist table upon requesting to be deleted.

6. A computing apparatus comprising:
   one or more computer processors; and
   one or more computer-readable mediums storing instructions to facilitate physical treatment of files in data processing environments comprising multiple application services and multiple storage services, wherein the instructions when executed by the one or more computer processors, cause the computing apparatus to:

receive, from a user, a request of a data treatment for anonymizing or removing user data;

obtain a staleness tolerance requirement for performing the data treatment based on a privacy policy;

maintain a list of data instances in a set of files of a table, wherein a data instance is associated with the request of the data treatment;

identify one or more files, stored in a storage service of the multiple storage services, marked as needing the data treatment for anonymizing or deleting one or more data instances in a file of the one or more files based on the request, wherein the one or more files are associated with the data instances in the list, wherein the storage service includes an immutable storage system;

determine whether a staleness of the file meets the staleness tolerance requirement for performing the data treatment;

in response to the staleness of the file meeting the tolerance requirement, add the file to a queue maintained in a processing system by a planner, wherein only the planner adds to the queue when the file is added to the queue, wherein the queue is shared by a plurality of workers in a data access system and queues tasks for the workers for performing the data treatment, each file in the queue is accessible by each of the plurality of workers, and each worker proceeds to dequeue the tasks from the queue sequentially;

prioritizing the file over a second file in the queue, the file having a sooner deadline based on the staleness tolerance requirement than a second deadline of the second file based on a second staleness tolerance requirement for the second file, wherein the deadline for the file is a deadline to perform the data treatment within the staleness tolerance requirement specified in the privacy policy;

after adding the file to the queue, dequeue the file from the queue and treat the file by at least one worker of the plurality of workers, wherein treating the file includes the at least one worker anonymizing or deleting the file to create a new file; and replace a previous version of the file in the storage service with the treated new file.

7. The computing apparatus of claim 6, wherein the instructions cause computing apparatus to determine that the file should be queued based at least on a staleness tolerance and a non-data removal tasks needing to be performed.

8. The computing apparatus of claim 6, wherein anonymizing user data comprises applying one or more of obfuscation, anonymization, pseudonymization, redaction, and masking to the user data.

9. The computing apparatus of claim 6, wherein to identify the one or more files marked as needing the data treatment, the instructions, when executed by the one or more computer processors, cause the computing apparatus to:

identify the one or more files marked as needing the data treatment based on a blacklist table, wherein users are added to the blacklist table upon requesting to be forgotten.

10. The computing apparatus of claim 6, wherein the instructions to add the file to a queue maintained in the processing system, when executed by the one or more computer processors, further cause the computing apparatus to prioritize a third file over a fourth file in the queue, the third file needing a data anonymization treatment and the fourth file needing a data removal treatment.

11. The computing apparatus of claim 6, wherein the instructions, when read and executed by the one or more computer processors, further cause the computing apparatus to, upon receiving the user anonymization request, logically deleting a user, wherein logically deleting the user comprises omitting the user from subsequent queries.

12. One or more non-transitory computer-readable storage media to facilitate physical treatment of files in storage for data processing environments comprising multiple application services and multiple storage services wherein the one or more non-transitory computer-readable storage media comprises stored instructions that when executed by one or more processors of one or more computing devices, cause the one or more computing devices to:

receive, from a user, a request of a data treatment for anonymizing or removing user data;

obtain a staleness tolerance requirement for performing the data treatment based on a privacy policy;

maintain a list of data instances in a set of files of a table, wherein a data instance is associated with the request of the data treatment;

identify one or more files, stored in a storage service of the multiple storage services, needing the data treatment for anonymizing or deleting one or more data instances in a file of the one or more files based on the request, wherein the one or more files are associated with the data instances in the list, wherein the storage service includes an immutable storage system;

determine whether a staleness of the file meets the staleness tolerance requirement for performing the data treatment;

in response to the staleness of the file meeting the tolerance requirement, add the file to a queue maintained in a data access system by a planner, wherein only the planner adds to the queue when the file is added to the queue, wherein the queue is shared by a plurality of workers in the data access system and queues tasks for the workers for performing the data treatment, each file in the queue is accessible by each of the plurality of workers, and each worker proceeds to dequeue the tasks from the queue sequentially;

prioritizing the file over a second file in the queue, the file having a sooner deadline based on the staleness tolerance requirement than a second deadline of the second file based on a second staleness tolerance requirement for the second file, wherein the deadline for the file is a deadline to perform the data treatment within the staleness tolerance requirement specified in the privacy policy;

after adding the queue with the file, dequeue the file from the queue and treating the file by at least one worker of the plurality of workers, wherein treating the file includes the at least one worker anonymizing or deleting the file to create a new file; and replace a previous version of the file in the storage service with the treated new file.

13. The one or more non-transitory computer-readable storage media of claim 12, wherein anonymizing user data comprises applying one or more of obfuscation, anonymization, pseudonymization, redaction, and masking to the user data.

14. The one or more non-transitory computer-readable storage media of claim 13, wherein the instructions, when executed by one or more processors of one or more computing devices, cause the one or more computing devices to, upon receiving the user anonymization request, logically delete a user, wherein logically deleting the user comprises omitting the user from subsequent queries.

15. The one or more computer-readable storage media of claim 12, wherein the instructions to add the file to a queue maintained in the data access system, when executed by one or more processors of one or more computing devices, cause the one or more computing devices to:

prioritize a third file over a fourth file in the queue, the third file needing a data anonymization treatment and the fourth file needing a data removal treatment.

16. The one or more non-transitory computer-readable storage media of claim 14, wherein to identify the one or more files marked as needing the data treatment, the instructions, when executed by one or more processors of one or more computing devices, cause the one or more computing devices to:

identify the one or more files marked as needing the data treatment based on a blacklist table, wherein users are added to the blacklist table upon requesting to be forgotten.

17. The one or more non-transitory computer-readable storage media of claim 12, wherein treating the file further includes changing data within the file to create an updated file.

18. The method of claim 1, wherein the file is treated by multiple workers including two or more workers, and the multiple workers treat the same file.

19. The computing apparatus of claim 6, wherein the file is treated by multiple workers including two or more workers, and the multiple workers treat the same file.

20. The one or more non-transitory computer-readable storage media of claim 12, wherein the file is treated by multiple workers including two or more workers, and the multiple workers treat the same file.

* * * * *

UNITED STATES PATENT AND TRADEMARK OFFICE
CERTIFICATE OF CORRECTION

| | | |
|---|---|---|
| PATENT NO. | : 12,450,197 B2 | Page 1 of 1 |
| APPLICATION NO. | : 16/935654 | |
| DATED | : October 21, 2025 | |
| INVENTOR(S) | : Khurana et al. | |

It is certified that error appears in the above-identified patent and that said Letters Patent is hereby corrected as shown below:

In the Claims

In Column 21, in Claim 15, Line 5, after "one or more" insert -- non-transitory --.

In Column 21, in Claim 16, Line 15, delete "claim 14," and insert -- claim 12, --, therefor.

Signed and Sealed this
Thirteenth Day of January, 2026

John A. Squires
*Director of the United States Patent and Trademark Office*